United States Patent

[11] 3,607,272

| [72] | Inventor | John B. Rust |
|---|---|---|
|  |  | Los Angeles, Calif. |
| [21] | Appl. No. | 616,587 |
| [22] | Filed | Feb. 16, 1967 |
| [45] | Patented | Sept. 21, 1971 |
| [73] | Assignee | Hughes Aircraft Company |
|  |  | Culver City, Calif. |

[54] PHOTOGRAPHIC POLYMERIZATION PROCESS AND PRODUCT
20 Claims, 3 Drawing Figs.

[52] U.S. Cl............................................................ 96/35.1,
 96/115 P
[51] Int. Cl........................................................... G03c 1/68

[50] Field of Search........................................... 96/115 P,
 35.1

[56] References Cited
UNITED STATES PATENTS
2,673,151 3/1954 Gerhart........................ 96/115
3,330,659 7/1967 Wainer......................... 96/35.1

*Primary Examiner*—Ronald H. Smith
*Attorneys*—James K. Haskell and Alton V. Oberholtzer

ABSTRACT: Photopolymerizable monomer medium and method of light exposure to effect exposure and development by multiple stages of polymerization and desensitizing photopolymerization with different light intensities, and the products produced therewith and thereby.

INVENTOR.
JOHN B. RUST,
BY
ATTORNEY.

PHOTOGRAPHIC POLYMERIZATION PROCESS AND PRODUCT

This invention relates to a method of photographic reproduction or recording of optical information in polymeric-type compositions, and the products thereof. More particularly, the invention relates to methods of effecting two or more stages of imagewise polymerization of polymerizable films and compositions of monomers containing cross-linking monomers, having a functionality greater than two, as an essential part, for photographically recording images in photochemically polymerizable media, with or without the inclusion of added information in other forms or stages of photopolymerization and desensitizing by additional polymerization without destroying the imaging polymerization, and the products thereof.

The reproduction of light images on a more or less permanent substrate or film is, of course, a well-understood process and almost an ancient art at this time. By far the most extensive photographic technique utilizes silver halide chemistry to achieve the reproduction of light images on a recordable medium by the intensity-responsive graded deposition of opaque silver particles. Likewise photopolymeric photography of light images or patterns is a well known and widely practiced procedure, particularly for pattern reproduction in polymer materials especially in the field of what is commonly called "photo-resists." In this latter technique, the photopolymerized medium is utilized to form patterns and the like on predetermined areas of a substrate in order to permit desired chemical treatment, such as etching, on areas of the substrate not protected by the chemically resistant polymer formed. Silver halide photography required the use of liquid chemical developers and fixing agents thereby being a somewhat time-consuming and inconvenient process in that special precautions must be taken to prevent exposure of the photographic film until after such development and fixing. Photopolymeric resist techniques likewise require the use of liquids or solvents to remove unreacted, unexposed portions of the polymer film in order to render the desired light image or pattern visible and useful as well as to fix the exposed polymer film.

It is therefore an object of the present invention to provide an improved photographic process, compositions therefor and the products.

Another object of the invention is to provide an improved photographic process which permits extremely rapid recording or exposure and which provides an immediately available reproduction for viewing and use and which may be stored indefinitely.

Yet another object of the invention is to provide an improved photographic process whereby an optical image may be recorded, developed and fixed in a relatively short interval of time without requiring the use of chemical reagents, wet or dry.

A further object of this invention is to provide a totally optical photographic process which is capable of recording information is a photosensitive composition and of desensitizing the photosensitive composition after the information has been recorded.

An additional object of this invention is to provide a disclosure wherein an improved control factor of optical density is effected by variations of monomer mixtures.

These and other objects and advantages of the invention will become apparent from the following description and drawing in which.

Figure 1:
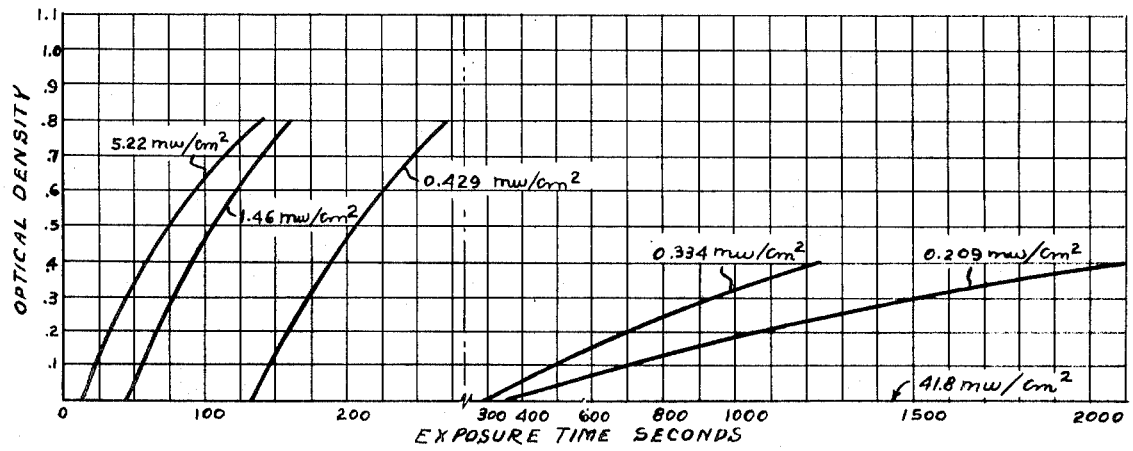
FIG. 1 is a graphical representation of the exposure time required to produce various photopolymer optical densities in a particular photopolymerizable composition as the intensity of the irradiating light is changed.

The advantages of this invention are realized by utilizing changes in the nature and ratio of monomers to produce striking changes in contrast in photopolymerizable mediums wherein the exposure and development of the desired light image are achieved by means of a light-induced, photochemical reaction and wherein fixation of the image is also accomplished preferably by means of a further light-induced, photochemical reaction. The further light-induced, photochemical reaction may be utilized to record additional information in one or more processing steps. In general, according to one embodiment of the process of the present invention, a photopolymerizable medium is employed which, when exposed to an image with light of a particular intensity, effects image with light of a particular intensity, effects image reproduction in wrinkled, perturbed or convoluted form. Subsequent exposure of the previously unexposed portions of the medium to a photo-flux of another and different selected intensity results in such portions being polymerized without wrinkling, perturbations or convolutions, and which may be used to record additional information. The effect of the convoluted surface patterns is to scatter both transmitted and reflected light so that the image formed by such patterns is readily discernible due to the scattered light. Since exposure, development and fixing are all accomplished by means of light, the speed and convenience of the photographic process of the present invention will be immediately appreciated.

While the mechanisms involved in the process of the present invention may not be fully understood at this time, it is believed that perturbation of polymeric films results from the fact that photo-induced polymerization occurs in a small area or volume of the film and tends to cause a change in the surface area which must be accommodated by a perturbation of the surface thereof which results in convolutions.

The degree of perturbation is proportional to the intensity of the radiant energy incident to the surface of the particular photosensitive medium and varies according to the proportion of the cross-linking agent present having an averaged functional characteristic greater than two. Therefore, the intensity pattern of an information-bearing light source will be faithfully reproduced in the film of a suitable photosensitive medium by the perturbation differences induced in the film by the incident light.

The initially unexposed areas are thereafter preferably desensitized by additional polymerization, polymerized by a method which does not produce film convolutions, but can produce polymer imaging providing additional information. Such lack of perturbation contrasts with the perturbed film of the image and furthermore, effectively renders the photosensitive composition insensitive to further irradiation, leaving the composition as a whole with a photographic recording therein and thereon.

The convoluted film patterns that are obtained in the process of the present invention have been found to take various forms. No matter what the forms may be, they are herein collectively termed "perturbations." In highly exposed portions of films prepared according to the invention, the convolutions are wave patterns upon which relatively steep peaks of polymerized material are superimposed. In lesser exposed film portions, wave patterns exist whose wavelength increases with decreasing exposure with some steep peaks of polymerized material interspersed therein. The convolutions so produced have peak-to-peak dimensions of approximately 10 microns and peak-to-valley dimensions of approximately 5 microns. These dimensions, however, can be altered by varying the initial viscosity and thickness of the photopolymerizable medium The effect of these convolutions is to scatter both transmitted and reflected light. Such scattering renders the convolution pattern visible, although Schlieren photography may be required as an aid in reading the pattern, with or without any additional pattern which may be initially or subsequently formed in the film composition by any appropriate manipulation of suitable imaging radiation and filters in irradiation of such image therein or thereon.

Although the entire photosensitive composition is polymerized in one embodiment of my process by the combined image forming and desensitizing steps, the film perturbations are viewable against this completely polymerized background because of the nature of the components of the photosensitive composition used herein. The photosensitive compositions employed herein contain in an appropriate solvent, polymerizable monomers having an average functional characteristic greater than two and preferably, in addition, a light-sensitive photocatalyst system capable of increasing the rate of polymerization of the monomer. The polymerizable monomer and solvent are preferably chosen so that the polymerized form of the monomers is a clear continuous transparent gel and not a particulate precipitate. If a particulate precipitate were formed upon polymerization, the individual particles would scatter light, even if each particle was transparent, so that the effect of such light scattering would be to produce an apparently opaque polymer mass. Against such a background the film perturbations would not be visible.

The image forming and fixing steps will first be described in detail. As previously noted, a light-scattering, transparent gel image is formed by irradiation of a photosensitive composition containing light-polymerizable monomers having a functionality greater than two, and preferably, a photocatalyst system, with light capable of being efficiently absorbed by one of the components of the photocatalyst system to cause polymerization of the monomers. The wavelength of the light chosen to initiate polymerization of the vinyl monomers will depend upon the absorption characteristics of the photoactive components of the photosensitive composition. If a photocatalyst system is used in combination with the polymerizable monomers, generally light having wavelengths lying in the visible portion of the spectrum will be employed to initiate polymerization of the monomer. Light which will initiate polymerization will hereafter be designated by the term "actinic" light.

It has been found that there exist minimum and maximum exposure light intensities for light capable of being efficiently absorbed by the photocatalyst, below and above which, respectively, no perceptible film perturbations are formed. The intensity range between these minimum and maximum intensities for such light will hereafter be designated as the "perturbation intensity range." It is believed that, below the minimum perturbation intensity range, the stresses which are formed in the photosensitive composition are relieved because of the slowness of the polymerization reaction. Additionally, it is believed that above the maximum perturbation intensity, polymerization takes place so quickly that sufficient stresses are not produced in the film to produce film convolutions.

Figure 2:
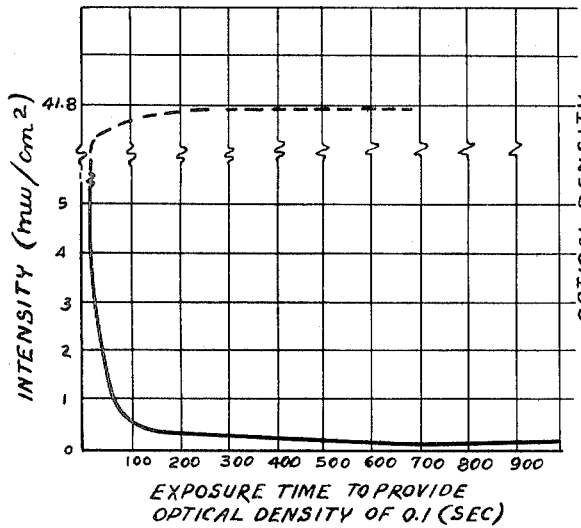
FIG. 2 is a graphical representation of the exposure light intensity vs. exposure time required to produce a photopolymer optical density of 0.1.

This phenomenon is shown by example 1 and by FIGS. 1 and 2. In brief, an aqueous photosensitive composition was made up comprising acrylamide, cross-linking monomer, sodium p-toluenesulfinate catalysts and methylene blue. Portions of this composition were placed between slides separated by plastic shims. The test specimens were irradiated with actinic light of varying intensity. The decrease in the transmitted light due to scattering of the incident light by the perturbations produced in the film, due to polymerization, was monitored and plotted in FIG. 1 as an increase in apparent optical density as a function of time.

As shown in FIG. 1, the increase in optical density was accelerated by increasing the intensity of the incident actinic light from 0.209 milliwatts/cm.$^2$. (mw./cm.$^2$) to 5.22 mw./cm.$^2$. At an incident light intensity of 41.8 mw./cm.$^2$, however, the monomer polymerized without convolutions being formed in the polymer gel, and the transmitted light remained unchanged.

FIG. 2 is a graphical representation of the data represented in FIG. 1 but in a somewhat different form to more clearly illustrate the effect of light intensity changes on film perturbation production. FIG. 2 represents the exposure time required to achieve an optical density of 0.1 at various light intensities but of the same wavelength. As is evident from FIG. 2, below a light intensity of about 0.1 mw./cm.$^2$, no visible image is produced. As the light intensity increases above about 0.1 mw./cm.$^2$, the time to produce an image of optical density of 0.1 decreases. However, as the light intensity increases, it is again no longer possible to produce a perturbation image having an optical density of 0.1. Thus, it will be apparent that film perturbations are produced in the photosensitive composition of example 1 when that composition is irradiated with actinic light having an intensity lying between about 0.1 mw./cm.$^2$ and below 41.8 mw./cm.$^2$.

The above-described perturbation intensity region will vary, however, depending upon the characteristics of the particular photosensitive medium. In the compositions, as described, the perturbation intensity region will be approximately the same as illustrated by example 1 and FIGS. 1 and 2 for the photosensitive compositions illustrative of this invention.

Following formation of an image comprising a pattern of film convolutions, the photosensitive composition may be desensitized by various methods. For example, the remaining unreacted monomer may be washed out of the photosensitive composition or the unexposed portions of the photosensitive compositions may be desensitized as described in copending applications.

As an intermediate step to such means of permanent desensitizing, the addition of further information may be effected by illumination of the photosensitive composition with one or more images, for a predetermined time interval, with light rays of an intensity which does not create perturbations. For example, supplementing the stage incapable polymerization radiation effecting perturbed imaging, the illumination of a further impressed image, or sequentially illuminated images with imaging light effecting polymerization, without perturbation, can be effected, as herein provided.

To avoid the use of extraneous washing or desensitizing agent, it is preferable to desensitize the initially unexposed areas by uniformly irradiating, or further recorded imaging irradiation, of the photosensitive composition with light capable of being absorbed by the photocatalyst system or monomer to cause polymerization of the monomer but incapable of permanently perturbing the film of the photosensitive composition. Thus, desensitization is effected, not by deactivating or removing one of the components of the photosensitive composition, but by polymerizing the initially unreacted monomer in a manner such that no perturbations are formed. The term "desensitization" will be applied to this step, however, since, after such exposure of the photosensitive composition to light, no additional polymerization results, when carried to completion. In the event of creating a photocopy of additional information, desensitization during an intermediate stage may be effected by control of $p$H and heating or addition of a silver compound and heating, as disclosed in the copending applications of Leroy J. Miller and John B. Rust entitled "Photopolymer Polymerization Fixation Process and Products," Ser. No. 583,650, now Pat. No. 3,531,282, and of John B. Rust entitled "Photopolymer Fixation Process and Products," Ser. No. 583,649, now U.S. Pat. No. 3,531,281, respectively, for permanent recording of the added information. Such disclosures as pertinent therein are included herein by reference thereto.

Desensitization is accomplished in the preferred embodiment by employing either light which is strongly absorbed by the photocatalyst system to initiate polymerization, without perturbation, or light which is of such a wavelength that it is only weakly absorbed by the photocatalyst system but capable of also initiating polymerization without perturbation. When light which is strongly absorbed by the photocatalyst is employed to desensitize the photosensitive composition, the intensity of such light must lie outside, i.e., above or below, the aforementioned perturbation intensity range. If the further desensitizing light is of such a wavelength that it is only weakly absorbed by the photocatalyst system, without effecting perturbation, the intensity of such light may be of any proper magnitude including those borderline intensities lying along the perturbation intensity range.

Fixing or desensitization is accomplished by either of the preceding means because, in each case, the rate of incident light absorption by the photocatalyst in the photosensitive composition is relatively small as compared with the rate of light absorption by the photocatalyst during the photopolymerization step. Because of the low absorption rate during the fixing step, polymerization of the monomer is slow and the photosensitive medium has sufficient time to adjust to any film disturbances. That is, because of slower and small viscosity changes due to low rates of polymerization, the surface of the photosensitive composition is able to relieve itself of any changes in surface stresses.

As desensitization takes place, the photosensitive composition surrounding the photopolymer image polymerizes to a transparent gel without stressing the surface of the photosensitive composition. Thus, although the entire photosensitive composition will be polymerized after the desensitization step, the image will be readily discernible form the surrounding areas of the photosensitive composition because of the film perturbation differences between the image and the surrounding areas.

To provide a well-defined image, it is necessary that the increase in viscosity of the initially exposed portions of the film be rapid. This is accomplished by employing photosensitive media which have initially relatively low viscosities and which contain at least some monomers having a functionality greater than two. The use of such monomers provides a rapid increase in viscosity in the initially relatively low viscosity media upon exposure and polymerization due to cross-linking of the polymer chains. Such rapid increases in viscosity maximize the perturbations and preserve them as a faithful image of the light source. As used herein, the terms "monomer" or "vinyl monomer" designate photopolymerizable monomers having a functionality greater than two (cross-linking agents) of a combination of photopolymerizable compositions containing monomers only some of which have a functionality greater than two.

In addition to the requirement that at least some of the monomers have a functionality greater than two, the polymerized form of the monomers must not form an opaque precipitate. Instead, the photopolymer should be a transparent solvated gel so that viewing of the image is due solely to perturbations in the film of the photosensitive composition. This requirement will, in some instances, mean that the use of a polyfunctional monomer as the sole monomer component is to be avoided. This is because some monomers having a functionality greater than two will be so highly cross-linked upon polymerization that they will precipitate out as opaque photopolymers. In such instances, the polyfunctional monomer must be, in effect, diluted with a monomer having a functionality equal to two to reduce the cross-linking bond density. For example, barium acrylate in aqueous solution polymerizes to an apparently opaque precipitate. However, if acrylamide is included in the photosensitive composition, the resulting copolymer is a transparent gel.

When polyfunctional monomers are used, it will be understood that, as the amount of polyfunctional monomer decreases in relation to the amount of monomer having a functionality of two, the viscosity changes will be less pronounced. This will, in turn, produce less identifiable photopolymer images and, accordingly, it will be recognized that the intensity region is controllable and varied according to the proportion of monomers.

The viscosity of the photosensitive compositions usable in this invention is adjusted to a certain viscosity range by the use of solvents capable of providing the desired viscosity. The solvents employed herein may be any solvents which are compatible with the components of the photosensitive composition provided that the solvent does not quickly relieve the stresses set up in the surfaces of the photosensitive composition. That is, it is believed that the solvent must have a sufficiently high viscosity and surface tension to make it difficult for the perturbations to relieve themselves as by migration of matter to or from the gel locations. For example, film perturbations produced in photosensitive compositions employing pure glycerine as the solvent are rapidly relieved so that no worthwhile perturbation images can be formed in such a composition.

Where it is desirable to use a particular solvent, such as pure glycerine, in which the stresses are too easily relieved, viscosity-increasing additives may be added to the photosensitive composition. Such addition serves to prevent the surface stresses form being relieved thereby providing well defined images.

On the other hand, it is preferable not to employ solvents which produced photosensitve compositions of high viscosity. As previously described, image definition is proportional to the rate of viscosity or surface area change.

In photosensitive compositions having a high initial viscosity, the surface perturbations are smaller than when solvents of low viscosity are being used. Therefore, images having reduced definition are produced in solutions of high initial viscosity.

As solvents capable of retaining the surface perturbations, I have used water, 1-propanol, methanol, dimethyl formamide, tetrahydrofurfuryl alcohol, and the like.

In practice, a suitable substrate is coated with a coating of the herein-described photosensitive composition. Preferably, only a thin coating is applied to the substrate. The combination of a substrate and a coating of photosensitive composition will be generally designated as a "film."

The film is then exposed to light radiation having wavelengths in the region between about 3,800 A. to about 7,200 A. To produce the most efficient photopolymerization system, the principal wavelength region of the incident light should conform to the main wavelength absorption region of the dye component of the photosensitive composition. For example, if the dye absorbs mainly in the yellow region of the spectrum, the exposure light should have a high percentage of its wavelengths in the yellow region, the red light region, the blue light region, the white light region, etc.

From the foregoing, it has been shown that a pattern can be reproduced in the photosensitive composition described herein by first irradiating such compositions with image effecting light having wavelengths corresponding to the principal wavelength absorption regions of the dye and having an intensity lying within the perturbation intensity region to produce a perturbation image in a particular pattern; and secondly, uniformly irradiating the photosensitive composition with light which is incapable of perturbing the surface of the composition but which is capable of causing polymerization of the initially unexposed monomer to render the initially unexposed areas insensitive to further exposure to visible light. If the image produced in this manner is a negative image of a particular object, then it will be appreciated that a positive image of the same object can be made by first irradiating the photosensitive composition with light in a desired pattern and having an intensity incapable of producing perturbations but capable of producing a homogenous transparent gel in the exposed areas; and secondly, uniformly irradiating with light of intensity capable of producing surface perturbations in the initially unexposed areas of the photosensitive composition. Use of this sequence of steps produces a transparent image surrounded by light-scattering perturbed areas.

It will be further appreciated that the process of this invention enables data to be rapidly recorded and rapidly fixed by completely optical methods. Thus, after image-forming exposure by light of appropriate wavelengths and intensity, the irradiating equipment can be rapidly changed to provide the necessary wavelengths and intensities for fixing. For example, the iris diaphragm in a projector used to form an image can be varied to provide lower or higher light intensities for the particular fixing method. Another way of rapidly changing the irradiating equipment is to drop a filter into the projection beam to alter the wavelength of the light incident to the photosensitive composition.

To further increase the speed of the herein-described process, presensitization of the photosensitive composition may be performed as described in copending application of John B. Rust and Leroy J. Miller entitled "Photopolymerization Photography — Reduction of Induction Period and Product" Ser. No. 583,652. In brief, a photosensitive composition is initially irradiated with actinic light for a time less than or equal to the induction period associated with such actinic light. Such irradiation, in effect, removed the polymerization inhibitors thereby increasing the sensitivity of the photosensitive composition to further irradiation.

Turning now to the specific components utilizable in the process of this invention, the photopolymerizable monomers will first be described. Monomers suitable in the process of this invention are those unsaturated compounds capable of addition polymerization by free radical formation and include polymerizable hydrocarbons containing polymerizable ethylenic linkages as vinylidene ($CH_2=CY_2$) and fluorocarbon monomers provided the monomers meet the previously described functionality requirements and form gels.

As previously noted, polyfunctional monomers may be used alone. Examples of such monomers are: N,N'-alkylenebisacrylamide such as N,N'-methylenebisacrylamide, tertiary acrylamides, and di- or trivalent metal salts of acrylic or methacrylic acid, including the magnesium, lanthanum, calcium and aluminum salts of such acids, and the like.

Monomers having a functionality of two may be used in combination with other polyfunctional monomers. Examples of these monomers are: vinyl chloride, vinylidene chloride, vinyl methyl ether, vinyl butyl ether, vinyl butyrate, styrene, vinyl benzoate, methyl methacylate, acrylic acid, acrylonitrile, acrylamide, and mixtures thereof.

The amount of vinyl monomer in the reaction medium can vary within extremely wide limits. On the one hand, the amount of monomer employed may be the maximum solubility of the particular monomer in a particular solvent. On the other hand, the monomer may be present in small molar concentrations of the order of $10^{12}$ or $10^{13}$ molar. Preferably the monomer concentration should be maintained above about $2.0 \times 10^{12}$ moles per liter because the rate of the polymerization reaction drops off rapidly at about this concentration.

As previously noted, the photosensitive compositions used herein, preferably contain photocatalyst systems. The function of such catalyst systems is to create polymerization-initiating free radicals by absorbing light having appropriate wavelengths. The photocatalyst systems illustrated herein include certain prior art catalyst systems, as well as those photoredox catalyst systems described in my copending applications as hereafter described.

Such prior art catalyst systems include a dye and a reductant. Absorption of light of appropriate wavelengths, generally between about 3,800 A. to about 7,200 A., by the dye raises the dye to a triplet state in which it reacts with the reductant to produce a series of secondary reactions which, in turn, produce polymerization-initiating free radicals. In the absence of radiation of appropriate wavelengths, the dye and reductant form a stable system. Because of the number of reactions required to produce the free radicals, photopolymer production employing prior art catalyst systems is relatively slow.

Examples of prior art reductants which are illustrative of the process of this invention include 2,2', 2''-nitrilotriethanol, thiourea, thiosinamine and 2,5-pentanedione.

The dyes generally include those dyes absorbing in the wavelength range between about 3,800 A. to about 7,200 A. provided that such absorption raises the dyes to an excited triplet state in which they are capable of reacting with the reductant to ultimately produce polymerization-initiating free radicals. Illustrative dyes include rose bengal, eosin, erythrosine, acriflavine and riboflavin, as well as those dyes set forth hereafter in connection with the photoredox catalyst systems of my copending application.

Because of the relative slowness of the prior art photocatalyst systems, it is preferable to employ the photoredox catalyst systems described in my copending applications, each of is entitled "Photopolymers and the Process of Making Same," filed Apr. 23, 1965, and Aug. 31, 1965, now abandoned and replaced by applications, Ser. Nos. 824,902 and 824,903, and assigned to the instant assignee (herein designated as "my copending applications"). As described therein, the photoredox catalyst system comprises (1) a photo-oxidant or dye capable of being raised to a photoactive level by absorbing light having wavelengths in the range between about 3,800 A. and about 7,200 A. and, when at such level, capable of accepting an electron from (2) a catalyst whereupon said catalyst produces polymerization-initiating free radicals. The increased polymerization rate provided by the photoredox catalyst systems of my copending applications increases the stresses in the surfaces of the photosensitive compositions thereby producing more sharply defined images.

The specific photo-oxidants usable in the process of this invention are those disclosed in said copending applications and are incorporated herein by reference. More specifically, they are members of the quinoidal dye family, such as phenothiazine dyes, phenazine dyes, acridine dyes, xanthene dyes, phenoxazine dyes, pyronine dyes, and the like.

The minimum required concentration of photo-oxidant of the photoredox catalyst system which is used in conjunction with the organic sulfinic compound is approximately $10^{17}$ moles per liter. As the photo-oxidant concentration is increased above this minimum concentration, the sensitivity of the photopolymer composition does increase; however, the sensitivity may pass through a maximum as the photo-oxidant concentration is further increased so that it may be desireable to avoid high concentrations ($10^{12}$ moles per liter or more), especially when the photosensitive solution to be polymerized is of greater thickness than a very thin film. However, since the optical properties of the photo-oxidant are dependent upon the quantities present, as well as upon the intensity of the radiation employed, the criteria for determining the proper or practical quantities of photo-oxidant and of organic sulfinic compound to be employed will be governed by considerations other than just the amount needed for catalyzing the photopolymerization reaction.

The catalysts disclosed in my copending applications include the organic sulfinic acids and certain derivatives thereof, triorgano-substituted phosphines and triorgano-substituted arsines. The derivatives of the organic sulfinic acids which can be employed are sulfinyl halides, sulfinamides, salts and organic esters of the organic sulfinic acids, as well as adducts of sulfinic acids with carbonyl compounds and especially aldehydes. Each of these organic sulfinic compounds is characterized by its ability to form a free radical by giving up an electron to the photo-oxidant in its activated or photoactive state. The free radicals so derived from the organic sulfinic compounds are capable of initiating polymerization of the aforedescribed vinyl monomers.

Examples of the organic sulfinic acids are: p-toluenesulfinic acid, benzenesulfinic acid, p-bromobenzenesulfinic acid, naphthalenesulfinic acid, 4-acetamidobenzenesulfinic acid, 5-salicylsulfinic acid, ethanesulfinic acid, 1,4-butanedisulfinic acid, and $\alpha$ or $\lambda$-toluenesulfinic acid. The salts of these acids may be any of the soluble salts which are compatible with the other components employed in the photosensitive solution and typically include the sodium salts, the potassium salts, the barium salts, the silver salts, the zinc salts and the aluminum salts. Appropriate esters of these acids typically include the methyl esters, the ethyl esters, the propyl esters and the butyl esters.

The sulfinyl halides include sulfinyl chlorides, for example, ethanesulfinyl chloride, and sulfinyl bromides, for example, 5-salicylsulfinyl bromide. The sufinamides include, for example, ethanesulfinamide; the N-alkylsulfinamides, such as N-methyl-p-toluenesulfinamide; and the N-arylsulfinamides, such as N-phenylbenzenesulfinamide. Aldehyde adducts of these sulfinic acids are, for example, the adducts formed with formaldehyde, acetaldehyde, isobutyraldehyde, heptaldehyde, and the like.

The triorgano-substituted phosphines and arsines or compounds thereof suitable for use in the practice of the present invention have the general formula:

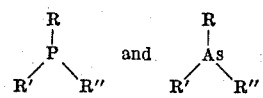

where R, R' and R" may be alkyl, aryl, aralkyl or alkaryl groups.

As the triogano-substituted phosphine or arsine for use in the present invention, I may employ, for example, such appropriate phosphine compounds as: tributylphosphine, triphenylphosphine, dibutylphenylphosphine, methyldiphenylphosphine, and methylbutylphenylphosphine. Examples of appropriate triorgano-substituted arsine compounds are: triphenylarsine, methyldiphenylarsine, trioctylarsine, dibutylphenylarsine, and methylbutylphenylarsine.

As mentioned in said copending applications, only catalytic amounts of the catalysts are needed in the photoredox catalyst system for photopolymerization. Thus, photoredox polymerization, according to the present invention, may be achieved by using concentrations of the reducing agent as small as $10^{16}$ moles per liter. Hence, when measured against the quantity of the monomer, the amount of the reducing agent can be exceedingly small. As an example, I have used one-tenth of a millimole of organic sulfinic compound catalyst per liter of solution to achieve a very satisfactory rate of photopolymerization. Higher concentrations, e.g., $10^{12}$ molar, may result in somewhat accelerated rates of photopolymerization.

In general, the photosensitive composition is prepared by bringing together (a) the polymerizable monomer in a suitable solution, (b) the dye in a suitable solution and (c) the catalyst in a suitable solution. Components (a), (b) and (c) may be brought together simultaneously or in any other order. For example, the dye and catalyst may be first combined to form a photoredox catalyst solution and then the monomer solution may be added.

The process of this invention will be further described by the following examples.

Example 1

This example illustrates the effect on a particular photosensitive composition utilizable in the process of this invention of changes in the intensity of the irradiating light.

The following solutions were made up:

Solution A

A solution of barium diacrylate was prepared by adding 321 g. of barium hydroxide octahydrate to 144 g. of distilled acrylic acid and 150 ml. of water. The pH of the solution, which was 7.3, was adjusted to 6.4 with a small additional quantity of acrylic acid. Solution A was obtained by warming a mixture of 45 g. of the barium diacrylate solution, 45 g. of recrystallized acrylamide, and 7.0 g. of N,N'-methylenebisacrylamide until all the solids were dissolved.

SOLUTION B

A photocatalyst solution was prepared by dissolving 2.14 g. of sodium p-toluenesulfinate dihydrate and 0.030 g. of methylene blue in 100 ml. of distilled water.

Solution C was made by mixing 4.0 ml. of solution A nd 1.0 ml. of solution B.

Portions of solution C were placed between two glass plates separated by a peripheral shim of plastic tape 7 mils thick. Experimental films, as slides, so prepared were irradiated with light of varying intensity by varying the opening of an iris diaphragm between the focusing lenses of a 500-watt tungsten filament projection lamp. As the monomer polymerized, the convolutions in the polymer gel scattered light so that the apparent transmittance of the material decreased, The transmitted light was measured with a photomultiplier tube and recorded as a function of time. As the monomer in the solutions polymerized, the transmitted light decreased due to scattering from the convolutions and perturbations in the polymer gel.

The results obtained are graphically illustrated in FIGS. 1 and 2, correlating the optical density with light intensity and relative exposure time.

Example 2

This example illustrates the printing and fixing of a negative image in a photosensitive composition of this invention.

A solution was prepared by dissolving with gentle warming 40 g. of acrylamide, 6 g. of N,N'-methylene- bisacrylamide, and 2.5 g. of Lauth's Violet (thionine) in 45 ml. of McIlvaine's buffer solution having a pH of 8. (The buffer solution was prepared by mixing together 5.5 ml. of 0.1 molar citric acid and 194.5 ml. of 0.2 molar disodium hydrogen phosphate.) The resulting solution was then made up to 100 ml. by adding additional buffer solution and was determined to be about $10^{14}$ molar in Lauth's Violet. Thereafter, 5 ml. of the foregoing solution was mixed with 0.5 ml. of 0.1 molar p-toluenesulfinate and placed in a sealed cylindrical transparent vial which was provided with inlet and outlet members to permit flushing the solution with nitrogen which was done for about one hour to remove any oxygen that might be present. The circular area of the vial bottom was such that 5.5 ml. of the solution therein provided a liquid layer thereof slightly less than 2 mm. thick.

The vial containing this solution was them placed over a portrait negative of a human subject and illuminated through the negative with a projector giving a maximum light intensity at the negative of about 0.0124 watts per square centimeter. Exposure time was carried out for about 20 seconds with this light which was then cut off and followed by uniform illumination from fluorescent room light for about one minute. The nonviscous, previously nonexposed portions of the monomer solution were found to have completely hardened to a firm polymer without perturbations whereas a faithful (perturbed) reproduction of the human portrait was produced on the surface of the first exposed portions.

A method of providing a modification of the preferred processing herein, providing additional information in the polymer film, is exemplified or accomplished, for example, by the second-step illumination being effected upon illumination printing thereon with fluorescent light producing desensitized areas and nondesensitized background areas. Upon exposure to normal light or projection of the image on the film projector, the light effects further polymerization of any nondesensitized area. Thus, there is in effect produced a perturbed image area and a nonperturbed or secondary image in the otherwise desensitized film. The secondary image may be fixed at an optimum level of polymerization by suitable control of the composition components or by control of the polymerization catalyst to monomer ratio and either fixed by control of pH and heating or addition of a soluble silver material and heating as described in the aforementioned applications. A further modification of the perturbed image representation may be effected by inclusion of a compound containing a benzyl moiety having nitro and carboxylate groups in the polymerizable film composition and secondarily, or primarily, imaging or fixing by the use of invisible radiation or substantially invisible (ultraviolet) radiation as disclosed in the copending applications of John D. Margerum entitled, "Method of Inhibiting Photopolymerization and Products," Ser. No. 853,651 and "Ultraviolet Hardening of Photosensitized Polyacrylamide And Products," included herein by reference thereto.

Example 3

This example illustrates the effect of using various electron donors including both prior art reducing agents and the catalysts described in my copending applications. The following solutions were made up:

Solution A

A solution of barium diacrylate was prepared by adding 321 g. of barium hydroxide octahydrate to 144 g. of distilled acrylic acid and 150 ml. of water. The pH of the solution, which was 7.3, was adjusted to 6.4 with a small additional quantity of acrylic acid. Solution A was obtained by warming a mixture of 45 g. of the barium diacrylate solution, 45 g. of recrystallized acrylamide, and 7.0 g. of N,N'-methylenebisacrylamide until all the solids were dissolved.

SOLUTION B

A dye solution was obtained by dissolving 0.0229 g. of methylene blue in 100 ml. of methanol.

Solutions C

Catalyst and reducing agent solutions (C to J) were prepared by dissolving the appropriate reagents in 100 ml. of water as follows:

| Solution | Reagent | Quantity (grams) |
| --- | --- | --- |
| C | sodium p-toluenesulfinate dihydrate | 2.2550 |
| D | 2,2', 2''-nitrilotriethanol | 1.4814 |
| E | thiourea | 0.760 |
| F | thiosinamine | 1.164 |
| G | 2,4-pentanedione | 0.962 |
| H | hydroxymethyl p-tolyl sulfone | 1.864 |
| I | p-acetamidobenzenesulfinic acid | 1.970 |
| J | sodium benzenesulfinate | 1.650 |

Solution K

Ten grams of gelatin were dissolved in 60 ml. of water by heating the mixture for 30 min. in a hot water bath, and 2.7 g. of hydroxymethyl p-tolyl sulfone were added. After being stirred for an additional 30 min. at 80° C, the solution cooled and gelled.

Solutions L–T

Photosensitive solutions L to T were derived by combining in each case 4.0 ml. of solution A, 0.5 ml. of solution B, and 0.5 ml. of one of the above catalyst or reducing agent solutions as follows: Photosensitive solutions L, M, N, O, P, Q, R, S, and T contained catalyst solutions C, D, E, F, G, H, I, J and K, respectively.

Portions of solutions L–T were placed between two glass plates separated by a peripheral shim of plastic tape 7 mils thick. Experimental slides so prepared were irradiated with light from a 500-watt tungsten filament projection lamp at a light intensity of about 3 milliwatts/cm.$^2$. As the monomer polymerized, the convolutions in the polymer gel scattered light so that the apparent transmittance of the material decreased. The transmitted light was measured with a photomultiplier tube and recorded as a function of time. In table 1 below are listed the periods of exposure required by each solution for the optical density to increase to certain given values, as well as the induction period during which no polymerization occurred.

TABLE 1

| Photosensitive solution | Induction period, (sec.) | Exposure time (sec.) required to achieve an optical density of— | | | | | |
| --- | --- | --- | --- | --- | --- | --- | --- |
| | | 0.1 | 0.2 | 0.4 | 0.6 | 0.8 | 1.0 |
| L | 35.8 | 41.1 | 43.2 | 45.6 | 47.5 | 49.0 | 50.8 |
| M | 432.0 | 446.6 | 452.0 | 458.1 | 462.4 | 465.6 | 468.6 |
| N | 212.0 | 550 | | | | | |
| O | 214 | 451 | 634 | | | | |
| P | 76.4 | 84.8 | 87.8 | 92.2 | 95.4 | 97.8 | 101.5 |
| Q | 34.6 | 44.4 | 47.8 | 50.8 | 53.4 | 55.5 | 58 |
| R | 48.6 | 52.8 | 54.7 | 57.0 | 58.6 | 60.5 | 61.7 |
| S | 39.6 | 48.6 | 51.6 | 55.4 | 58.2 | 60.5 | 62.8 |
| T | 30.8 | 36.9 | 40.0 | 44.9 | 49.6 | 53.7 | 57.7 |

Example 4

This example illustrates the use of triorgano-substituted phosphines and triorgano-substituted arsines as catalysts in the photosensitive compositions of this invention.

Solution A

A McIlvaine's buffer solution with a pH of 8.0 was prepared by dissolving 27.63 g. of anhydrous disodium phosphate and 0.5186 g. citric acid in enough distilled water to make 1,000 ml. of solution. Ninety grams of recrystallized acrylamide and 13.5 g. of N,N'-methylenebis-acrylamide were then dissolved in sufficient buffer solution to make a total volume of 200 ml.

Solution B

A dye solution was prepared by dissolving 0.0132 g. of methylene blue in 100 ml. of 1-propanol.

SOLUTION C

A catalyst solution was obtained by dissolving 2.6194 g. of triphenylphosphine in 100 ml. of 1-propanol.

SOLUTION D

This catalyst solution consisted of 3.064 g. of triphenylarsine dissolved in 100 ml. 1-propanol.

Photosensitive solutions were derived from the above solutions by mixing 4.0 ml. of solution A and 0.5 ml. of solution B with 0.5 ml. of either solution C or solution D. Portions of these solutions were exposed to visible light as described in example 3. The results were the same regardless of which catalyst solution was used. After 10 min. of illumination, the optical density increased to 0.06. This very small change could be amplified, however, by projection with schlieren optics.

EXAMPLE 5

This example illustrates the effect of varying the amount of cross-linking agent.

SOLUTION A

A solution of barium diacrylate was prepared by adding 157.5 g. of barium hydroxide octahydrate to 157.5 ml. of water and 72 ml. of distilled acrylic acid. The mixture was kept at 60°–80° C. and stirred for 2 hours, then filtered. Sufficient acrylic acid was added to lower the pH from 12.7 to 7. A 35 g. portion of this solution was combined with 45 g. of recrystallized acrylamide and enough water was added to the resulting solution to make a total weight of 100 g.

SOLUTION B

Fifty grams of solution A were mixed with 3.4 g. of N,N'-methylenebisacrylamide and the mixture was heated until the solid was all dissolved. It remained in solution when it was cooled to room temperature.

SOLUTION C

To 25 g. of solution B were added 1.7 g. of N,N'-methylenebisacrylamide. All of the solid dissolved when the solution was heated, but some recrystallized when it was cooled to room temperature. Solution C was the saturated supernatent solution.

SOLUTION D

To a solution of 79 ml. of acrylic acid in 146.7 ml. of water were added 16.3 g. of lanthanum oxide and 126.2 g. of barium hydroxide octahydrate. The mixture was stirred for 4 hours at 60°–80° C., then treated with 8 g. of activated carbon and filtered. A small quantity of barium hydroxide was added to adjust the pH to 7. Twenty grams of this solution were combined with 13 g. of recrystallized acrylamide, 9 g. of N,N'-methylenebisacrylamide and 20 ml. of water to produce solution D.

SOLUTION E

A McIlvanie's buffer solution with a pH of 8.0 was prepared by dissolving 27.63 g. of anhydrous disodium phosphate and 0.5186 g. of citric acid in enough distilled water to make 1,000 ml. of solution. Ninety grams of recrystallized acrylamide and 13.5 g. of N,N'-methylenebisacrylamide were then dissolved in sufficient buffer solution to make a total volume of 200 ml.

SOLUTION F

A photocatalyst solution was prepared by dissolving 2.14 g. of sodium p-toluenesulfinate dihydrate and 0.030 g. of methylene blue in 100 ml. of distilled water.

SOLUTIONS G-J

These photosensitive solutions were derived by mixing 1.0 ml. of solution F with 4.0 ml. of the appropriate monomer solution as follows:

| Photosensitive solution | Monomer Solution |
| --- | --- |
| G | B |
| H | C |
| I | D |
| J | E |

Figure 3:
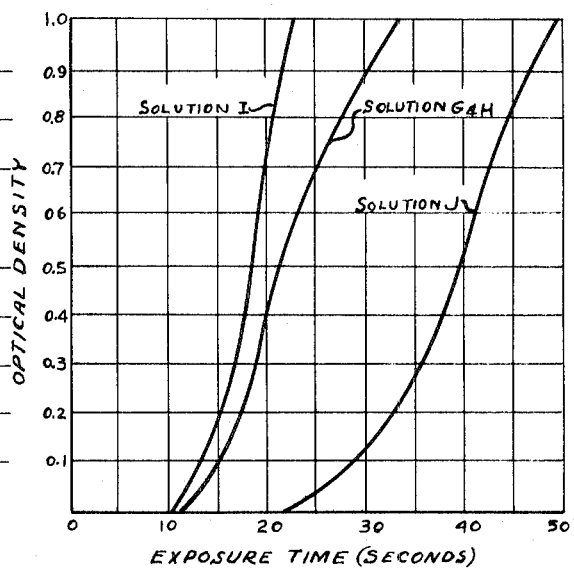
FIG. 3 is a graphical representation of optical density vs. exposure time for the photosensitive compositions of this invention employing various amounts of cross-linking agents.

Solutions G-J were exposed as described in example 3. FIG. 3 describes the optical density as a function of the exposure time. Solutions G and H behaved the same within the limits of experimental error.

EXAMPLE 6

An alternative method of effecting perturbation imaging in the foregoing examples is provided by including therewith a desensitizing agent activated by invisible radiation (as ultraviolet light). For example, upon the addition thereto of a compound containing a nitrobenzyl moiety of the character of 4-nitrophenylacetic acid and the like, as disclosed in the aforementioned application of John D. Margerum, included herein by reference thereto, the imaging may be affected by radiating the polymerizable film containing such desensitizing agent with ultraviolet imaging radiation to desensitized background area. Upon subsequently exposing the film to visible radiation in the perturbation range, to effect perturbation of the nondesensitized areas, a perturbed image is created. Otherwise, desensitizing irradiation of the image in the image area coupled with nondesensitizing irradiation of the background area, in subsequent projection or illumination with perturbation radiation, effects perturbation of the background area. Thus, with subsequent permanent desensitization of the initially desensitized area by optical means, as described, or control of pH below about 8 and heating, or addition of a soluble silver salt and heating, fixing in the reverse order of perturbation may be affected.

Subsequently, the initially desensitized area can be polymerized and/or fixed by appropriate light, or other means as herein provided. Thus, the imaging light may be visible or invisible and either effecting desensitized areas or polymerized areas in the photosensitive composition. When the imaging light is by invisible radiation, e.g., ultraviolet, the desensitized area upon being illuminated by perturbation irradiation is temporarily unreactive while the nondesensitized area is polymerized to a perturbed state. Otherwise, simultaneously before or after initial imaging perturbation, secondary or subsequent imaging irradiation may be effected to provide the composite film with added information temporary or fixed polymeric or nonpolymeric form.

As is evident from the foregoing description and examples, I have disclosed unique methods of producing photopolymer images in particular photosensitive compositions. Additionally, I have disclosed a novel method of fixing such photopolymer images so that they may be stored for future use. As described, photopolymer images are produced as perturbation patterns in the film of these photosensitive compositions as polymerization takes place.

The photosensitive compositions of this invention include solutions of a polymerizable monomer and a photocatalyst system. The polymerizable monomer includes at least some cross-linking agent to provide the relatively rapid polymerization necessary for the production of image-forming film perturbations. Preferably, the photocatalyst system comprises a photo-oxidant and a catalyst as described in my copending applications. Use of such a photocatalyst system produces photopolymer image rapidly. The solvent employed herein is capable of retaining the perturbation forming photopolymers in solution as transparent solvated gels rather than permitting the photopolymers to precipitate out as the insoluble, opaque gels. Preferably, the solvent has a relatively low viscosity so that the surface stresses or perturbations are maximized.

Film perturbations are formed in these photosensitive compositions by irradiation with visible light in the perturbation intensity range. Such irradiation may be used to produce an image by irradiating a photosensitive composition in the form of a pattern or it may be used to produce a perturbed background by uniformly irradiating a photosensitive composition after a transparent photopolymer image has been formed. In the method wherein a perturbed polymer image is initially formed, the photosensitive composition is then preferably uniformly irradiated with light incapable of perturbing the film of the particular photosensitive composition, but capable of producing transparent polymerization of the initially unexposed areas. In the method where the background areas are perturbed, the photosensitive composition is initially irradiated with light in the form of a pattern, which light is incapable of perturbing the photosensitive composition, to form a transparent image of the pattern. Thus, images bearing the relation of positive to negative to each other can be produced.

By the herein disclosed method of effecting perturbation of a reproduced image, it is now possible to obtain an outstanding reproduction of the photograph image as if molded or cut in a block of the photopolymerizable composition. For example, while the perturbed film may be utilized in forming a casting of plastic, or the like, with the copy of an image impressed thereon, it has been preferable to form a larger body, or block, of a photopolymerizable composition, as exemplified, reproduce the image thereon, as described, and fixing polymerization with solidification of the block in the manner indicated. Thus, there is provided a new method and structure for providing imaging for tile and wall decoration, monument decoration and the like.

Having described the present embodiments of my discovery, invention, or improvements in accordance with the patent statutes, it will now be apparent that some modifications and variations may be made without departing from the spirit and scope thereof. The specific embodiments described are provided by way of illustration and are illustrative of my discovery, invention, or improvement, which is to be limited only by the terms of the appended claims.

What is claimed is:

1. A method of effecting photographic-imaging polymerization of optical information and desensitization of polymerization by multiple stages of polymerization of a composite photosensitive polymerizable composition comprising the steps of:

irradiating a selected pattern area of a photosensitive polymerizable composition containing a. a photopolymerizable monomer material containing polyfunctional cross-linking monomers, and
   b. a light-activated polymerization catalyst system for effecting polymerization of said monomer material comprising a photoredox combination of a photoactive dye material and a catalyst reactive with said dye material in the presence of light activation thereof to generate a free radical polymerization initiator, with imaging radiation of a desired pattern intensity in a selected wavelength range of between about 3,800 A. and about 7,200 A. and effecting therewith in said desired pattern a stage of said free radical generation and imaging polymerization, and additionally irradiating said composition with a different light intensity than said pattern intensity and effecting differential and desensitizing polymerization of the said composition without destruction of the said pattern.

2. The method of claim 1 consisting of the steps of effecting the imaging pattern by irradiation in the wavelength range of about 3,800 A. to about 7,200 A. and of an intensity from 0.209 milliwatts/cm.$^2$ to less than 41.8 mw./cm.$^2$ and the desensitizing irradiation is of a different light intensity than said pattern-imaging intensity.

3. The method of claim 1 comprising the steps of producing the imaging pattern by radiation lower than the wavelength range of about 3,800 A. to about 7,200 A. and the imaging stage of perturbation polymerization is effected by irradiation in the wavelength range of over 3,800 A. to about 7,200 A. and an intensity of from 0.209 milliwatts/cm.$^2$ to less than 41.8 mw./cm.$^2$.

4. A method of effecting image reproduction in a perturbed pattern in a composite of a photosensitive polymerizable composition containing polymerizable monomers having a functionally greater than two and a light-sensitive activable photoredox photopolymerization effecting catalyst system comprising the steps of:
   a. irradiating said polymerizable composition with a reproducible image with a light intensity of from 0.209 milliwatts/cm.$^2$ to less than 41.8 mw./cm.$^2$ and effecting a perturbation image thereby, and
   b. further irradiating said photosensitive polymerizable composition with a different light intensity than said imaging light intensity and effecting desensitizing polymerization of the unperturbed image portion of said composition.

5. The method of claim 4 wherein the step of desensitizing polymerization is an intermediate step and effected by additional polymerization of said composition with a different light intensity not effecting perturbation.

6. A method of photoimaging comprising forming imagewise perturbations in a polymer film which comprises:
   a. providing a light-sensitive photopolymerizable composition comprising:
      1. a polyfunctional addition polymerizable compound containing a plurality of ethylenically unsaturated groups being capable of forming a high, cross-linked polymer by free-radical-initiated, chain-propagating addition polymerization;
      2. a free-radical-generating addition polymerization initiator combination activatable by light radiation having wavelengths lying between about 3,800 A. and about 7,200 A. comprising a light-absorptive compound selected from the class consisting of phenothiazine, phenazine, acridine, xanthene, phenoxazine, and pyronine dye material, and mixtures of same, in combination with an organic substituted compound selected from the group consisting of organic sulfinic compound, triorgano-phosphine and triorganoarsine, and mixtures of the same, said organic compound characterized by being capable of reacting with the light-excited form of said light-absorptive compound to generate said free-radical initiator;
   b. providing a thin film of said composition;
   c. imagewise exposing a selected area of said film to light radiation having wavelengths lying between about 3,800 A. and about 7,200 A. and of an intensity to produce in said film an imagewise distribution of perturbed polymerized monomers;
   d. and subjecting said film to other light radiation having wavelengths lying between about 3,800 A. and about 7,200 A. said other light radiation having an intensity that is different than the intensity of said imagewise radiation, said other light radiation being capable of differentially polymerizing nonexposed areas of said imagewise-exposed light-sensitive composition.

7. A method for forming a photopolymer image in a photosensitive composition comprising the steps of:
irradiating a photosensitive composition comprising
   a. a photopolymerizable monomer material containing cross-linking monomers having a functionality greater than two;
   b. a photoredox photocatalyst system consisting of photo-oxidant material and catalyst combination capable of producing free radicals for initiating polymerization of said monomer material when said photo-oxidant is irradiated with light rays in the range of about 3,800 A. to about 7,200 A. and of varying intensity for polymerization of said monomer material when irradiated with light rays in said range; and
   c. a solvent for said monomer material and said photocatalyst system,
with an imaging light in a desired pattern area and having, in combination, an intensity and wavelengths such that polymerization of said monomers in said photosensitive composition due to said first imaging actinic light produces film perturbations in said photosensitive composition in the form of said pattern; and
   further irradiating said photosensitive composition with a different actinic light, said different actinic light effecting polymerization of said monomer material but said different actinic light having an intensity and wavelengths such that the said photosensitive composition in the area not polymerized by said initial irradiation is not perturbed by the polymerization thereof with said different actinic light.

8. The method of claim 7 wherein at least some of said monomer material has a functionality greater than two.

9. The method of claim 7 wherein at least some of said monomer material has a metal ion attached thereto, said metal ion having a valence greater than one.

10. The method of claim 7 wherein said vinyl monomer having a functionality greater than two is selected from the group consisting of N,N'-methylenebisacrylamide and di- and trivalent metal acrylates.

11. The method of claim 9 wherein said metal ion is selected from the group consisting of magnesium, lanthanum, calcium, aluminum, lead, barium and mercury.

12. A method for forming a photopolymer image comprising the steps of:
initially irradiating a photosensitive composition comprising
   a. a photopolymerizable vinyl monomer system including monomers having a functionality greater than two containing;
   b. a photocatalyst system comprising a photo-oxidant and organic catalyst material selected from the group consisting of organic sulfinic compound, organic phosphine compound and mixtures of said compounds characterized by being capable of reacting with the light excited form of said photo-oxidant to generate free radicals for inducing polymerization of said monomer system when irradiated with actinic light in the wavelength range of about 3,800 A. to about 7,200 A.; and
   c. a mutual solvent system for said vinyl monomer and said photocatalyst system,
with a first selected actinic light in a desired pattern, said first actinic-light-inducing polymerization of said vinyl monomer but said first actinic light having an intensity and wavelengths such that an unperturbed image of said pattern is produced in the exposed pattern area of said photosensitive composition; and
   further irradiating said photosensitive composition with a second selected actinic light having an intensity and wavelengths such that polymerization of said vinyl monomer in the initially unexposed pattern area of said photosensitive composition produces film perturbations in said initially unexposed area.

13. A method of photoimaging by multiple polymerization in forming a photopolymer image in a photosensitive light-polymerizable composition comprising the steps of:
   1. irradiating a photosensitive composition containing
      a. a combination of an addition polymerizable, ethylenically unsaturated compound being capable of forming a high polymer by free-radical-initiated chain-propagating addition polymerization with a substantial proportion of a polyfunctional addition polymerizable compound containing a plurality of ethylenically unsaturated groups being capable of forming a high, cross-linked polymer by free-radical-initiated, chain-propagating addition polymerization;

b. a photo-oxidant and a catalyst system, said system comprised of a free-radical-generating addition polymerization initiator combination activatable by light radiation having wavelengths lying between about 3,800 A. and about 7,200 A. comprising a light-absorptive compound selected from the class consisting of phenothiazine, phenazine, acridine, xanthene, phenoxazine, and pyronine dyes, and an organic substituted compound selected from the group consisting of organic sulfinic compound, triorganophosphine compound and triorganoarsine compound, said compound characterized by being capable of reacting with a light-excited form of said light-absorptive compound to generate said free-radical initiator;

c. a solvent for said vinyl monomer, said photo-oxidant and said catalyst, 2. with a first visible light in a desired pattern, said light having, in combination, an intensity and wavelengths such that polymerization of said vinyl monomer in said photosensitive composition due to said visible first light produces film perturbations in said photosensitive composition in the form of said desired pattern; and 3. further uniformly irradiating said photosensitive composition with a second visible light, said second visible light being capable of inducing polymerization of said vinyl monomer but said second visible light having an intensity and wavelengths such that the said photosensitive composition is not perturbed by the polymerization of said vinyl monomer thereby.

14. The method of claim 13 wherein at least some of said vinyl monomer has a metal ion attached thereto, said metal ion having a valence greater than one.

15. The method of claim 14 wherein said metal ion is selected from the group consisting of magnesium, lanthanum, calcium, aluminum, lead, barium and mercury.

16. The method of claim 13 wherein said vinyl monomer having a functionality greater than two is selected from the group consisting of N,N'-methylenebisacrylamide and di- and trivalent metal salts of acrylic and methacrylic acid.

17. A method of photoimaging by forming photopolymer imaging in a photosensitive composition comprising the combined steps of:

1. irradiating a photosensitive composition with a multiple of light radiations having wavelengths between about 3,800 A. and about 7,200 A., said photosensitive composition comprising a. a combination of an addition polymerizable, ethylenically unsaturated compound being capable of forming a high polymer by free-radical-initiated chain-propagating addition polymerization with a substantial proportion of a polyfunctional addition polymerizable compound containing a plurality of ethylenically unsaturated groups being capable of forming a high, cross-linked polymer by free-radical-initiated, chain-propagating addition polymerization;

b. a photocatalyst system inducing polymerization of said monomer when irradiated with actinic light comprising a combination of a dye material and catalyst capable of producing free radicals for polymerization comprising an organic photoreducible dye and a reducing agent having a reduction potential incapable of reducing said dye in the absence of light but of sufficient strength to reduce the photoexcited dye said dye and reducing agent forming a stable system in the absence of light which undergoes reduction of the dye upon exposure to visible light; and c. a solvent for said vinyl monomer and said photocatalyst system, 2. said multiple of light radiations comprising a. a first stage light irradiation for a time to increase the sensitivity of said photosensitive composition;

b. further irradiating said photosensitive composition with imaging light in a desired pattern having, in combination, and intensity and wavelengths such that polymerization of said vinyl monomer in said photosensitive composition due to said imaging light produces film perturbation polymerization in said photosensitive composition in the form of said pattern; and c. further irradiating said photosensitive composition with other light, said other light effecting polymerization of said vinyl monomer but said other light having an intensity and wavelengths such that the said photosensitive composition is not perturbed by the polymerization of said vinyl monomer thereby.

18. A method of photoimaging comprising forming imagewise perturbations in a polymer film which comprises:

a. providing a mixture of a visible-light-sensitive composition containing:

1. a combination of an addition polymerizable, ethylenically unsaturated compound being capable of forming a high polymer by free-radical-initiated chain-propagating addition polymerization with a substantial proportion of a polyfunctional addition polymerizable compound containing a plurality of ethylenically unsaturated groups being capable of forming a high, cross-linked polymer by free-radical-initiated, chain-propagating addition polymerization;

2. a combination of a dye material and catalyst capable of producing free radicals for polymerization comprising an organic photoreducible dye and a reducing agent having a reduction potential incapable of reducing said dye in the absence of light but of sufficient strength to reduce the photoexcited dye said dye and reducing agent forming a stable system in the absence of light which undergoes reduction of the dye upon exposure to visible light;

b. imagewise exposing said mixture to radiation having wavelengths lying between about 3,800 A. and about 7,200 A. to produce an imagewise distribution area of perturbations;

c. further subjecting said exposed mixture to uniform radiation having wavelengths lying between about 3,800 A. and about 7,200 A. said uniform radiation having an intensity substantially different from the intensity of said imagewise radiation and effecting another area of unperturbed polymerization.

19. A method for forming a photopolymer image in a photosensitive composition comprising the steps of:

irradiating a photosensitive composition with light in the wavelength range of about 3,800 A. to about 7,200 A., said composition comprising a. a photopolymerizable vinyl monomer film including monomers having a functionality greater than two polymerizable to a transparent gel;

b. a photocatalyst system including polymerization of said monomer when irradiated with light in said wavelength range; and c. a solvent for said vinyl monomer and said photocatalyst system, with a first light in said wavelength range in a desired image pattern having, in combination, an intensity and wavelengths such that polymerization of said vinyl monomer in said photosensitive composition due to said first actinic light produces film perturbations in said photosensitive composition in the form of said image pattern; and additionally irradiating the whole of said composition with light of low intensity and causing polymerization thereby without effecting further film perturbations and without destroying said image pattern therein.

20. The product by the process of claim 1.

PO-1050
(5/69)

UNITED STATES PATENT OFFICE
CERTIFICATE OF CORRECTION

Patent No. 3,607,272  Dated September 21, 1971

Inventor(s) John B. Rust

It is certified that error appears in the above-identified patent and that said Letters Patent are hereby corrected as shown below:

Col. 8, line 25,   "$10^{17}$"   should be --$10^{-7}$--.

Col. 9, line 25,   "$10^{16}$"   should be --$10^{-6}$--.

Col. 9, line 30,   "$10^{12}$"   should be --$10^{-2}$--.

Signed and sealed this 22nd day of May 1973.

(SEAL)
Attest:

EDWARD M. FLETCHER, JR.                ROBERT GOTTSCHALK
Attesting Officer                       Commissioner of Patents